United States Patent

[11] 3,601,581

[72] Inventor Clyde C. Cone
 7395 W. 67th Ave., Arvada, Colo. 80002
[21] Appl. No. 31,237
[22] Filed Apr. 23, 1970
[45] Patented Aug. 24, 1971

[54] ELECTRIC HEATING DEVICE FOR HEATING THE EXTREMITIES OF PLASTIC PIPES
 8 Claims, 8 Drawing Figs.
[52] U.S. Cl. ................................................ 219/386,
 34/104, 126/19 M, 219/373, 219/430, 219/432,
 219/521, 219/530, 219/535
[51] Int. Cl. ........................................................ F27d 11/00
[50] Field of Search ................................................ 219/429,
 430, 432, 433, 436, 438, 439, 399, 373, 40Q, 416,
 462, 420–421, 530, 520, 535, 521, 375, 380,
 385–387; 99/447; 126/271.2 B; 34/104, 202

[56] References Cited
UNITED STATES PATENTS

| 890,857 | 6/1908 | Hadaway, Jr. | 219/430 |
| 1,977,482 | 10/1934 | Klause | 219/430 |
| 2,413,176 | 12/1946 | Deaton | 219/535 X |
| 2,785,275 | 3/1957 | Verble | 219/385 |
| 3,219,798 | 11/1965 | Farrell | 219/387 |
| 3,539,771 | 11/1970 | Zeiser | 219/380 X |

Primary Examiner—Volodymyr Y. Mayewsky
Attorney—R. H. Galbreath

ABSTRACT: A cylindrical, open-topped, vertically walled pot with a perforated bottom adapted to be secured in spaced relation to a conventional electrical heating element so as to receive the extremity of a length of plastic pipe and support a circular air-deflecting disc therein so that air, heated by said element, will flow through the perforations in the bottom and longitudinally of both the inside and outside surfaces of said extremity to heat and soften the latter for expansive purposes.

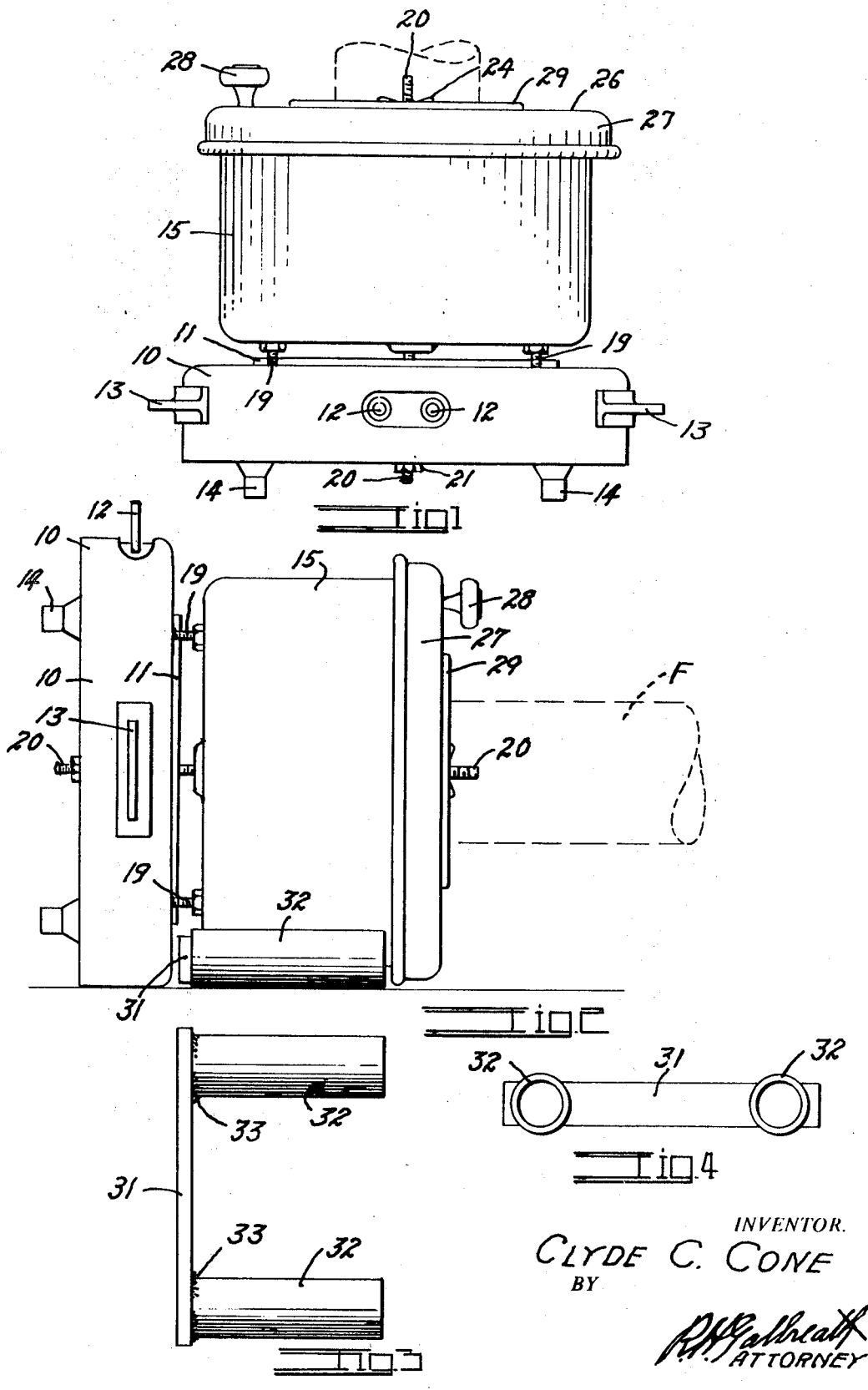

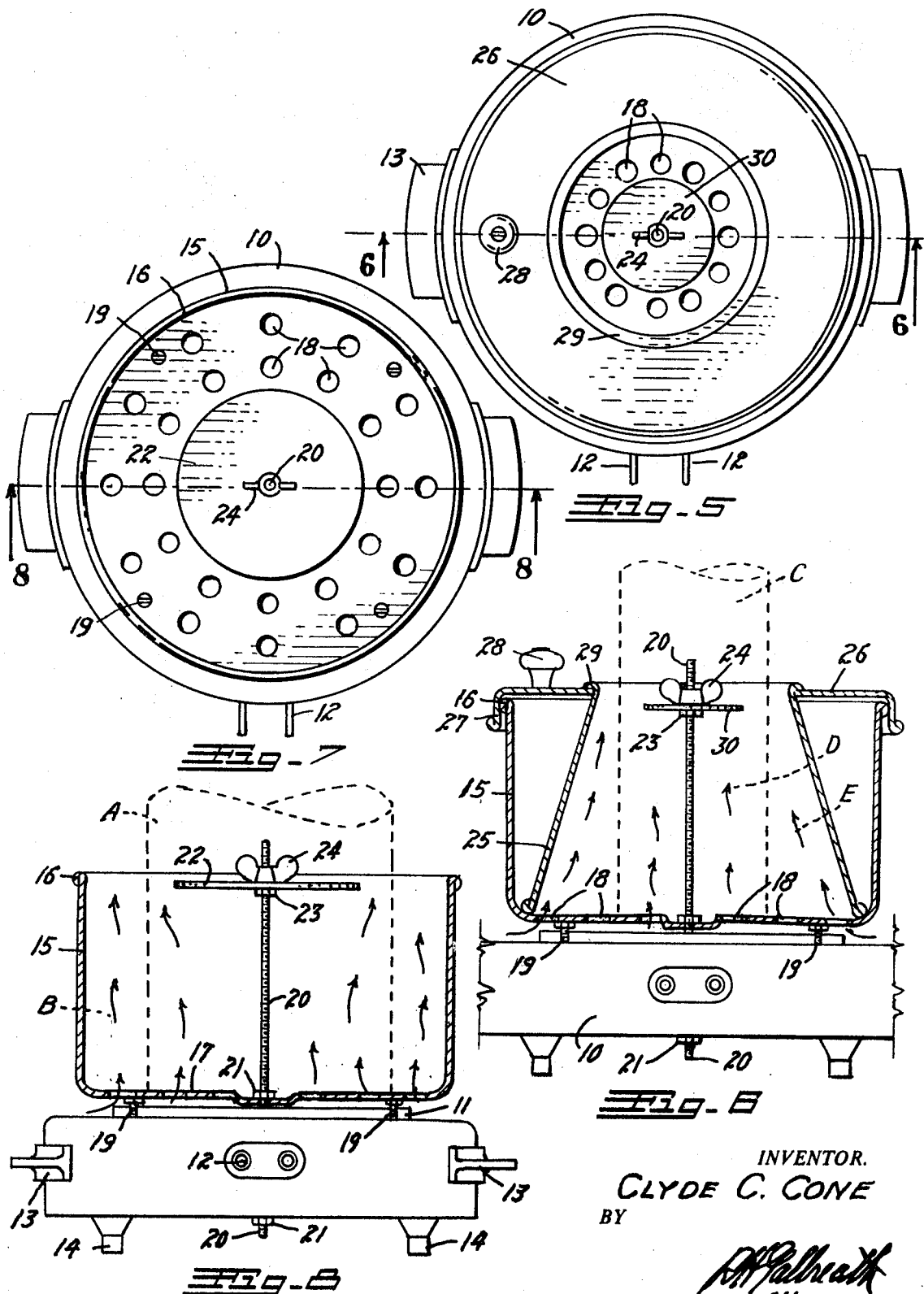

ELECTRIC HEATING DEVICE FOR HEATING THE EXTREMITIES OF PLASTIC PIPES

This invention relates to means for thermally softening the extremities of lengths of plastic pipe so that desired extremities thereof can be radially expanded to receive metal or plastic fittings so as to form and assemble plastic pipe systems.

Attempts have been made to soften the extremities of thermoplastic pipe lengths for the above purposes by impinging gas jets against the pipe walls. This has resulted in damaged pipe walls, since the proper temperature range is critical and uniform temperature distribution is practically impossible.

Attempts have been made to render the extremities of plastic pipe lengths ductile by suspending the lengths with their lower extremities immersed in a hot fluid bath of the proper temperature. The latter attempts have produced operable results but are time consuming, burdensome and costly in operation. Attempts have also been made to soften the extremities of plastic pipe by inserting the extremities into proximity with coils of electrical resistance wire. Such attempts have not been uniformly successful since all of the heat is transferred by radiation. As a result, the proximate surface of the pipe wall receiving the radiation becomes overheated before the distant surface reaches the required ductile temperature. Flaws in the plastic body result.

The principal object of this invention is to provide a highly efficient portable, electrically energized, plastic pipe heating device which will avoid the above-enumerated objections and which can be readily applied to the extremities of plastic pipe lengths of various lengths and of various diameters and which will uniformly heat the pipe extremity both internally and externally by means of a uniform longitudinal flow of heated air so that a desired uniform temperature distribution will be quickly attained throughout the plastic body without strain or damage so as to produce the desired ductility therein.

Other objects and advantages reside in the detail construction of the invention, which is designed for simplicity, economy and efficiency. These will become more apparent from the following description.

In the following detailed description of the invention, reference is made to the accompanying drawings which form a part hereof. Like numerals refer to like parts in all views of the drawings and throughout the description.

In the drawing:

FIG. 1 is a side elevational view of the improved plastic pipe heating device as it would appear when used on vertical plastic pipe lengths of relatively small diameter;

FIG. 2 is a similar view with the device turned 90° for use on horizontal pipe lengths;

FIG. 3 is a detail plan view of a heater support for use in supporting the improved heating device in the horizontal position of FIG. 2;

FIG. 4 is a detail front view of the heater support of FIG. 3;

FIG. 5 is a top plan view of the heating device as it appears when in use on vertical pipe lengths such as shown in FIG. 1;

FIG. 6 is a fragmentary, side view of the device, shown partially in cross section, as it would appear looking sidewardly on the line 6—6, FIG. 5;

FIG. 7 is a top plan view showing the improved heating device as it would appear when in use on pipe lengths of relatively large diameter; and FIG. 8 is a side view of the device, shown partially in cross section, as it would appear looking sidewardly on the line 8—8, FIG. 7.

The necessary heat for actuating the plastic pipe heating device of this invention is obtained from a conventional electrical "hotplate" 10 of a type having a circular flat ceramic top bed 11 in which resistance coils are imbedded. The hotplate is provided with usual current prongs 12, handles 13, and supporting legs 14. Any suitable hotplate may be used. The one at present in use is known as "McGraw Edison—Model 391001—725 Watts 120 Volts" but any equivalent plate may be used.

The plastic pipe heating assembly of this invention includes a cylindrical, vertical-walled, pipe-receiving pot 15 having an open top surrounded by a reinforcing bead 16 and substantially flat perforated bottom 17 containing a plurality of air holes 18 over its entire area. The bottom 17 is provided with a circular series of spacing screws 19 which when in use contact the hotplate 10 around the circumference of the ceramic top bed 11 and maintain the bottom 18 spaced above the bed so that air may flow radially inward beneath the bottom 17 and upwardly through the air holes 18. The bottom is fixedly and concentrically mounted on the hotplate by means of a threaded axial bolt 20, provided with clamp nuts 21, which extends upwardly through the hotplate and through the perforated bottom 17 and terminates above the top of the pot 15.

The invention is adaptable for use on large diameters of plastic pipe, say from 8 inches to 10 inches in diameter, and for use on relatively smaller diameters of pipe, say from three-fourths inch to 6 inches diameters.

If it is intended to work upon the larger diameters, a circular deflecting disc 22, having a smaller diameter than the internal diameter of the pipe to be worked on, is horizontally and concentrically mounted on the axial bolt 20 approximately in the plane of the open top of the pot. The deflecting disc is clamped in place between a disc supporting nut 23 and a disc-clamping nut, preferably a wingnut 24, on the axial bolt, as shown in FIGS. 7 and 8, and the plastic pipe extremity to be softened is inserted in the pot as shown in broken line at "A" in FIG. 8. It can be seen that hot air will flow upwardly through all of the airholes and uniformly travel upwardly both exteriorally and interiorly of the pipe walls, as shown by the arrows "B" in FIG. 8, so as to quickly, uniformly and properly soften the plastic pipe extremity substantially to the full depth of the pot.

If the invention is intended to be used upon the smaller diameters of pipe, such as indicated at "C," FIG. 6, a hollow, truncated, conical air-directing cone 25, having an open bottom and an open top, is concentrically positioned within the pot 10 as shown in FIGS. 5 and 6. The open bottom of the directing cone 25 is of sufficient diameter to cover all of the airholes 18 and the open top thereof is of sufficient diameter to receive the largest of the smaller diameters of plastic pipe upon which the device is to be used.

The directing cone 25 is preferably fixedly mounted in an annular lid 26 having a downwardly directed rim 27 which snaps over and frictionally engages the top bead 16 of the pot to maintain the cone 25 in place therein. The lid 26 is preferably provided with a finger knob 28 to facilitate its removal and the upper annular edge of the cone 25 is flanged outwardly as shown at 29 and secured to the lid 26 in any desired manner such as by welding. A second air-deflecting disc 30 may be positioned on the axial bolt 20 to replace, if necessary, the previously described disc 22. The second disc 30 should have a diameter slightly smaller than the internal diameter of the pipe to be worked upon.

It can be seen that when in use on the smaller diameters of pipe, the air will flow upwardly through those airholes 18 that are closely adjacent the axial bolt 20, as shown by the arrows "C" in FIG. 6, into the inside of the pipe and upwardly through the more diametrically distant airholes about the outside of the pipe, as shown by the arrows "D." Thus, it can be seen, that air of the proper temperature will uniformly flow upwardly upon both sides of the pipe wall to properly soften the pipe extremity without over or under heating the intervening plastic.

For the convenience of custom shops in which a variety of different diameters of pipe are encountered, a plurality of deflecting discs will be furnished with the device so that they may be readily interchanged, by simply removing and replacing the wingnut 24, so as to place the proper disc within the selected pipe.

For use in shops where it is necessary or more convenient to handle the pipe horizontally, a heater support is furnished with the device. The heater support comprises an elongated metallic strap 31 to which two pipe stubs 32 are welded, as indicated at 33 in parallel, spaced-apart relation as shown in FIGS. 3 and 4. For horizontal use, the heater support is placed on a suitable supporting surface 34 and the plastic pipe heating assembly is turned upon it side with the pipe-receiving pot 15 resting upon and between the pipe stubs 32 and with the strap 31 extending tangentially between the hotplate 10 and pot bottom 17, as shown in FIG. 2. The pipe can then be handled horizontally as shown in broken line at "F" in FIG. 2.

While a selected form of the invention has been above described, it is understood that mechanical variations and detail substitutions can be made by one skilled in the art without departing from the spirit of the invention.

Having thus described the invention what is claimed and desired to be secured by Letters Patent is:

1. A heating device for heating the extremities of plastic pipe lengths for expansive purposes comprising:
   a. an electric hotplate;
   b. a circular, substantially flat bottomed, cup-shaped pot attached to said hotplate adapted to axially receive an extremity of a length of plastic pipe;
   c. a plurality of airholes perforating the bottom of said pot;
   d. spacing means for maintaining the perforated bottom in spaced relation to said hotplate;
   e. means for securing said pot to said hotplate so that hot air from said hotplate will enter said airholes and flow longitudinally of said length of pipe;
   f. an axial support concentrically arising from the bottom of said pot; and
   g. an air-deflecting disc mounted on said support so as to deflect the flow of hot air radially outward toward the inner surface of said plastic pipe.

2. A heating device as described in claim 1 in which:
   a. the plurality of airholes are so positioned in said bottom that hot air will be simultaneously directed both interiorally and externally of said plastic pipe.

3. A heating device as described in claim 2 having:
   a. a concentric conical air-deflecting cone having an open lower extremity of sufficient diameter to cover substantially all of said airholes and an open upper extremity of smaller diameter sufficient to closely encircle said plastic pipe.

4. A heating device as described in claim 3 having:
   a. an annular lid frictionally enclosing said pot and circumferentially surrounding the upper extremity of said deflecting cone; and
   b. an air-deflecting disc positioned centrally in said upper extremity.

5. A heating device as described in claim 4 having:
   a. an axially positioned support arising from the bottom of said pot, said air-deflecting disc being mounted on said support so as to deflect the flow of hot air radially outward toward the inner surface of said plastic pipe.

6. A heating device as described in claim 5 in which:
   a. said deflecting cone is unitarily mounted in and circumferentially surrounded by said lid.

7. A heating device as described in claim 6 having:
   a. a heater support adapted to receive and support said pot in an axially horizontal position when desired.

8. A heating device as described in claim 7 in which said heater support comprises:
   a. a metallic strap adapted to be placed horizontally and tangentially between said pot and said hotplate; and
   b. two spaced-apart, parallel, tubular stubs projecting from said strap into supporting engagement with opposite sides of said pot when the latter is positioned in an axially horizontal position.